(12) United States Patent
Liu

(10) Patent No.: US 11,407,007 B2
(45) Date of Patent: Aug. 9, 2022

(54) MINI SUBWOOFER DOUBLE DRIVE LOW-FREQUENCY VIBRATOR

(71) Applicant: Chizhoushi Honggang Science and Technology Electronics Co., Ltd, Chizhou (CN)

(72) Inventor: Qiang Liu, Chizhou (CN)

(73) Assignee: Chizhoushi Honggang Science and Technology Electronics Co., Ltd, Chizhou (CN)

( * ) Notice: Subject to any disclaimer, the term of this patent is extended or adjusted under 35 U.S.C. 154(b) by 244 days.

(21) Appl. No.: 16/931,496

(22) Filed: Jul. 17, 2020

(65) Prior Publication Data

US 2021/0394234 A1 Dec. 23, 2021

(30) Foreign Application Priority Data

Jun. 17, 2020 (CN) .......................... 202010555872.X

(51) Int. Cl.
*H02K 33/02* (2006.01)
*H02K 33/16* (2006.01)
(Continued)

(52) U.S. Cl.
CPC ............ *B06B 1/045* (2013.01); *B06B 1/0276* (2013.01); *H02K 33/02* (2013.01); *H02K 33/16* (2013.01); *H04R 9/02* (2013.01); *H04R 9/025* (2013.01)

(58) Field of Classification Search
CPC ........ H02K 33/16; H02K 33/02; H02K 33/04; H02K 33/06; H02K 33/08; H02K 33/10;
(Continued)

(56) References Cited

U.S. PATENT DOCUMENTS

2011/0204732 A1* 8/2011 Miyamoto ............. H02K 33/16
310/25
2014/0376766 A1* 12/2014 Chen ......................... H04R 9/06
381/400
(Continued)

FOREIGN PATENT DOCUMENTS

KR 20040107148 A * 12/2004
WO WO-2005004310 A1 * 1/2005 ............. B06B 1/045

OTHER PUBLICATIONS

Park (KR 20040107148 A) English Translation (Year: 2004).*

*Primary Examiner* — Tulsidas C Patel
*Assistant Examiner* — Robert E Mates
(74) *Attorney, Agent, or Firm* — Bayramoglu Law Offices LLC

(57) ABSTRACT

A mini subwoofer double drive low-frequency vibrator includes a base, an upper cover, a side cover, a flexible printed circuit, a coil, a magnetic body, a counterweight, a spring piece, an internal welding piece, an external welding piece, an insulating tape, and a buffer. The magnetic body and the coil includes a symmetrical double-driving structure at both upper and lower part to mutually offset components in a non-vibration direction of an electromagnetic force and cancel vibration noises. The spring piece adopts a V-shape structure to increase an effective length of a deformation zone and to make a response frequency even lower. Two V-shape springs are distributed symmetrically in a center, making an operation more stable. The buffer is adopted to enhance service life, for fear of a spring damage caused by high circuit voltage.

3 Claims, 7 Drawing Sheets

(51) Int. Cl.
*B06B 1/04* (2006.01)
*H04R 9/02* (2006.01)
*B06B 1/02* (2006.01)

(58) Field of Classification Search
CPC ........ H02K 33/12; H02K 33/14; B06B 1/045; B06B 1/0276; H04R 9/025
See application file for complete search history.

(56) References Cited

U.S. PATENT DOCUMENTS

2017/0033663 A1* 2/2017 Wang .................... H02K 33/00
2018/0026511 A1* 1/2018 Akanuma .............. H02K 33/18
                                                                                                         310/20
2019/0356208 A1* 11/2019 Okayasu ................ B06B 1/045

* cited by examiner

MINI SUBWOOFER DOUBLE DRIVE LOW-FREQUENCY VIBRATOR

CROSS REFERENCES TO THE RELATED APPLICATIONS

This application is based upon and claims priority to Chinese Patent Application No. 202010555872.X, filed on Jun. 17, 2020, the entire contents of which are incorporated herein by reference.

TECHNICAL FIELD

The invention relates to the field of vibrator, particularly to vibrators driven by audio signal for subwoofer and dynamic effect with its response frequency lower than 100 Hz

BACKGROUND

In the electroacoustic equipment, the audio signal is restored to sound through the voice diaphragm vibration of the loudspeaker. A large caliber speaker should be used in order to make subwoofer (below 125 Hz). Due to the limited installation space, headphones and small audio equipment are incompatible with subwoofer speakers and can only resort to using mid-range speakers as compromise, however, fail to provide dynamic and stunning effects.

SUMMARY

The invention targets at subwoofer defects for headphones and other small audio equipment and aims to provide a vibrator with small install-size, low frequency and high response which can be directly driven by audio to make up for the subwoofer of small audio equipment.

To realize the purpose, the technical scheme in the invention is to adopt a mini subwoofer double drive low-frequency vibrator, characterized by the base, upper cover, side cover, flexible printed circuit board, coil, magnetic body, counterweight, spring piece, internal welding piece, external welding piece, insulating tape, buffer, lower stator, upper stator, and the vibration generator;

The lower stator of said vibrator is formed with the said insulating tape stuck on the said base and one end of the said coil fixed on the said tape;

The upper stator of said vibrator is formed with the said insulating tape stuck on the said upper cover and one end of the said coil fixed on the said tape;

The said magnetic body is fixed in the holes on the upper and lower sides of the said counterweight symmetrically distributed from top to bottom to form two working surfaces. One end of the said spring piece is closely attached to the stepped face of said counterweight after it overlaps with the said internal welding piece. The vibration generator of the said vibrator can be formed with the said magnetic body, the said counterweight, the said spring piece and the said internal welding piece fixed together after riveting or laser welding;

The magnet of the lower working surface in the said vibration generator is directly opposite to and spaced from the coil in the said lower stator; the other end of the said spring piece is close to the side column of the said base and is fixed with the said external welding piece by laser welding after the overlapping; the coil of the said upper stator is directly opposite to and spaced from the magnet of the upper working surface in the said vibrator; the upper cover of the said upper stator is buckled with the base of the said lower stator to form a vibrator after each two are fixed by laser welding;

A symmetrical driving circuit is formed, with one end of the said flexible printed circuit board with a notch stuck to the side of the said upper cover, the wire ends of two said coils welded on the said flexible printed circuit board, and the other end of the said flexible printed circuit board stuck to the front of the said upper cover.

The said spring piece adopts a V-shape structure and is distributed symmetrically in the center with its one end fixed on two diagonal angles of the said counterweight respectively and the other fixed on the side column of the said base accordingly; the response frequency of the said mini subwoofer double drive low-frequency vibrator is set at 40-100 hz.

The said vibrator also comprises said side cover and said buffer; the said buffer is bonded to the side column of the said base; the said side cover welded on the two sides of the said vibration body forms a closed space with the said lower stator and the said upper stator so that a sound cavity can be taken shape.

A symmetrical double-driving structure is adopted in the invention to mutually offset the components in non-vibration direction of electromagnetic force and cancel vibration noises.

The flat structure is adopted in the invention to meet the installation demands for headphones and small audio equipment and to make up for subwoofer sound defects by lowering down the product height. With particular reference to headset devices in E-sport, the reality in the game can be heightened by using the invention as a tactile feedback driving unit.

The invention can also be driven by pulsating DC or sinusoidal AC, serve as the vibration source of certain instruments and meters, and offer provide tactile feedback for handheld devices or touch screens.

BRIEF DESCRIPTION OF THE DRAWINGS

To clarify embodiments in the invention or technical scheme of the prior art, the brief introduction is given to figures needed in the description of embodiments and prior art. It is evident that figures described below are only embodiments of invention. Those of ordinary skill in the art can obtain other diagrams based on present ones on the prerequisite of paying no creative effort.

SYMBOL DESCRIPTION OF RELEVANT PARTS

11 Base, 12 Upper Cover, 13 Insulating Tape, 14 Coil, 21 Counterweight, 22 Magnetic Body, 23 Spring Piece, 24 Internal Welding Piece, 31 External Welding Piece, 32 Buffer, 33 Flexible Printed Circuit, 34 Side Cover, 10a Lower Stator, 10b Upper Stator 10b, 20 Vibration Generator, 30 Vibration Body, 21a Stepped Face.

DETAILED DESCRIPTION OF THE EMBODIMENTS

To better clarify the purpose, technical scheme and advantages of the embodiment, a clear and complete description is given below by explaining embodiment drawings. It is evident that only parts of embodiments, yet not all, are listed in the description. Based on the embodiments listed in the invention, all other embodiments obtained by those of ordinary skill in the art on the prerequisite that no creative efforts are paid are within the extent of this invention protection.

Figure 1:
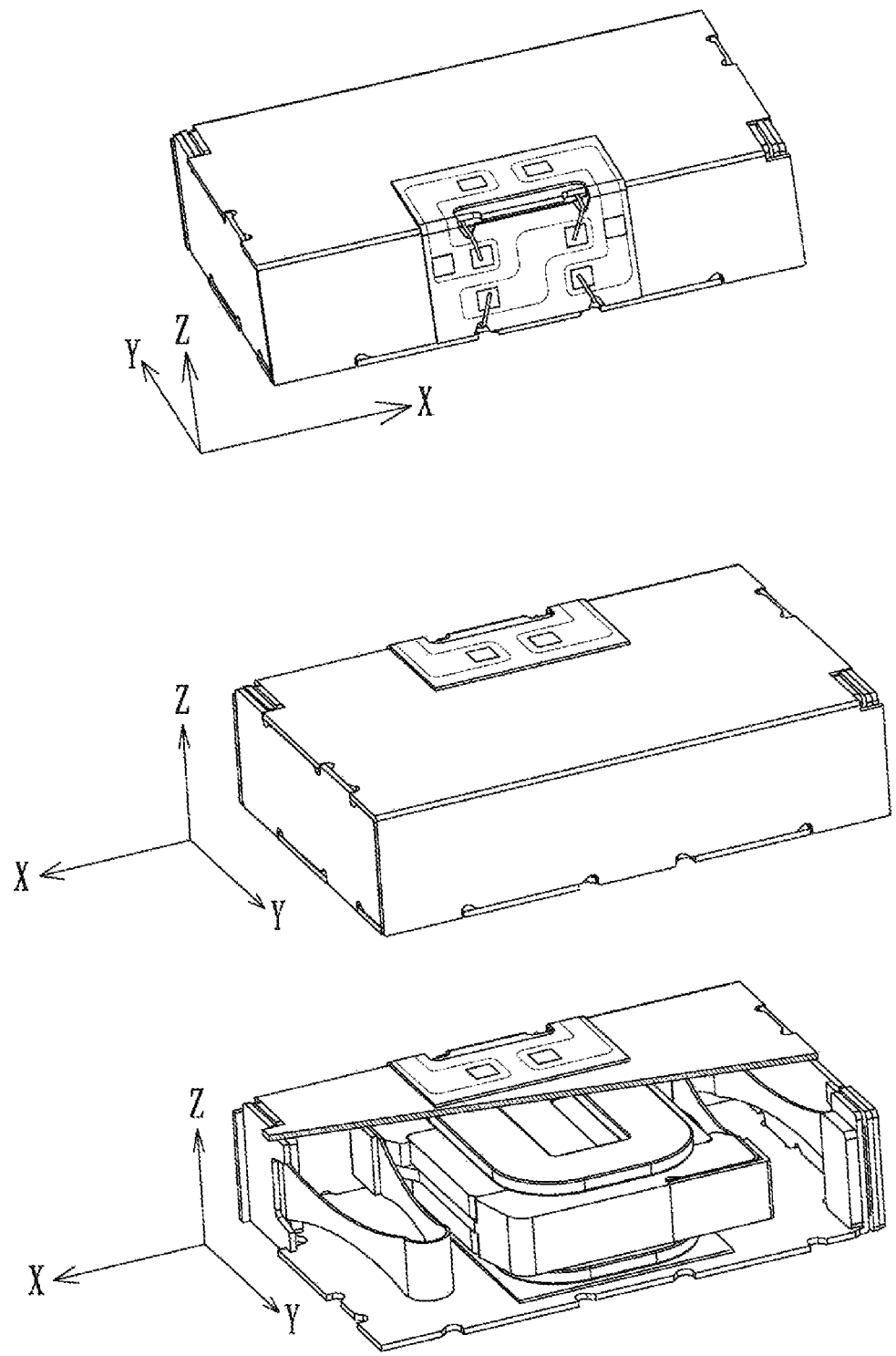
FIG. 1 is a stereogram of a mini subwoofer double drive low-frequency vibrator provided by the embodiment of the invention.
Figure 2:
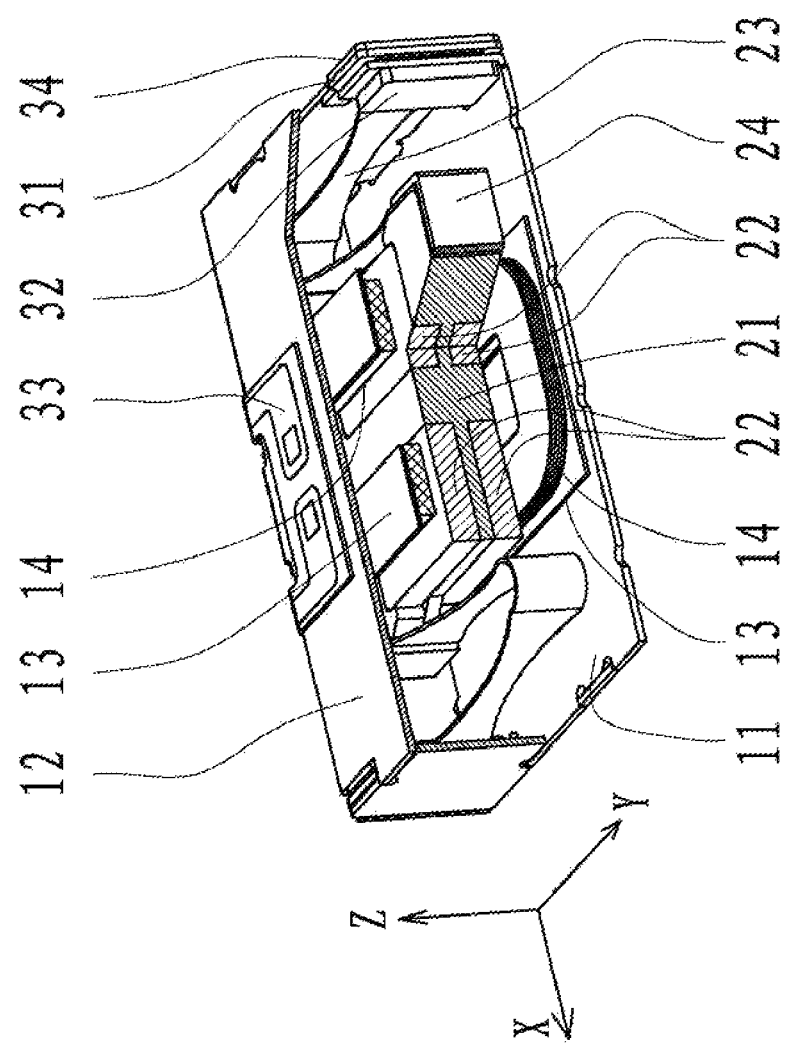
FIG. 2 is the structure of a mini subwoofer double drive low-frequency vibrator provided by the embodiment of the invention.
Figure 3:
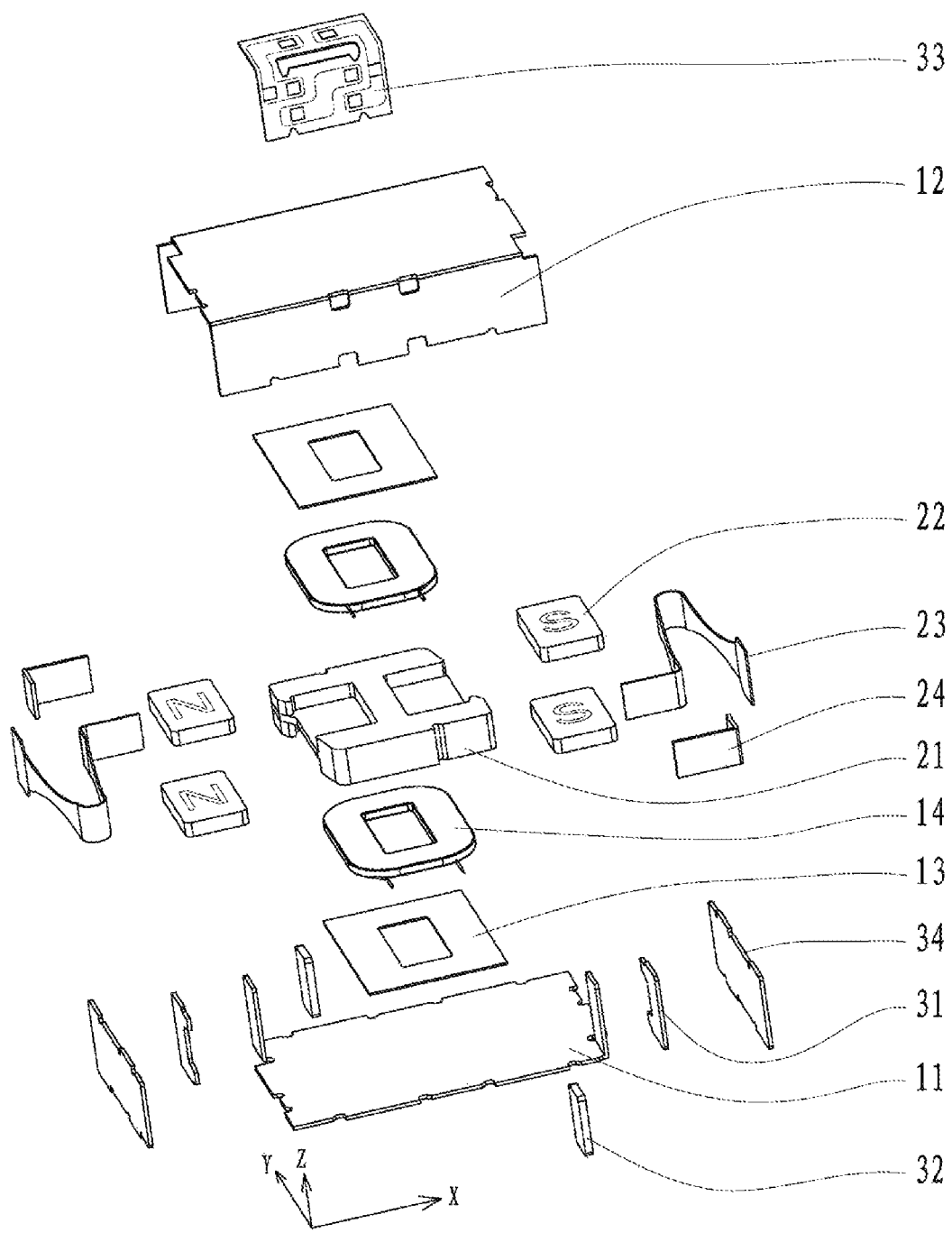
FIG. 3 is an exploded view of the structure of a mini subwoofer double drive low-frequency vibrator provided by the embodiment of the invention.

It should be noted that the low frequency is in relative terms in the embodiments of mini subwoofer dual drive low-frequency vibrator. Various response frequency range can be obtained by changing the width or material thickness of the spring piece. The description of following embodiment is presented as is shown in FIG. 2 for the sake of simplification From FIGS. 1 to 9, a mini subwoofer dual drive low-frequency vibrator is provided as the embodiment in the invention, which consists of the base 11, upper cover 12, insulating tape 13, coil 14, counterweight 21, magnetic body 22, spring piece 23, internal welding piece 24, external welding piece 31, buffer 32, flexible printed circuit 33, side cover 34. For the convenience of description, components of the above parts are also included, such as the lower stator 10a, upper stator 10b, vibration generator 20, vibration body 30.

Figure 4:
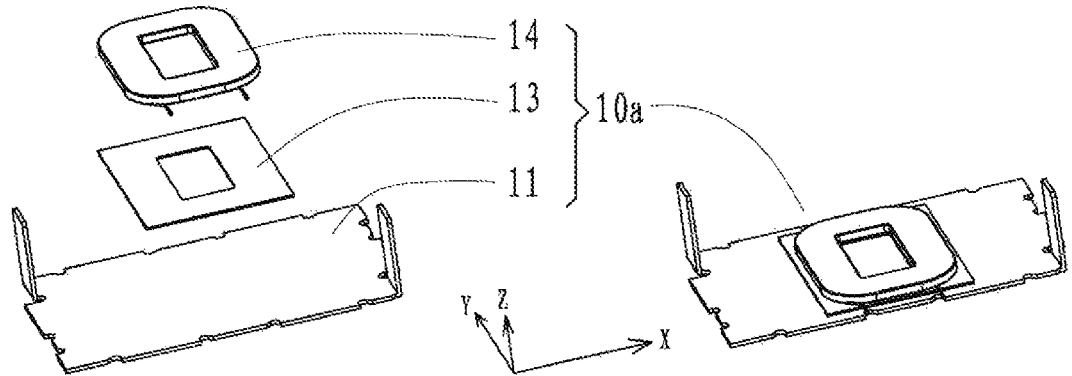
FIG. 4 presents the lower stator of a mini subwoofer double drive low-frequency vibrator provided by the embodiment of the invention.

As is shown in the FIG. 4, the lower stator 10a of the vibrator is formed with insulating tape 13 stuck to the base 11, and one end of the coil 14 fixed on the insulating tape 13.

Figure 5:
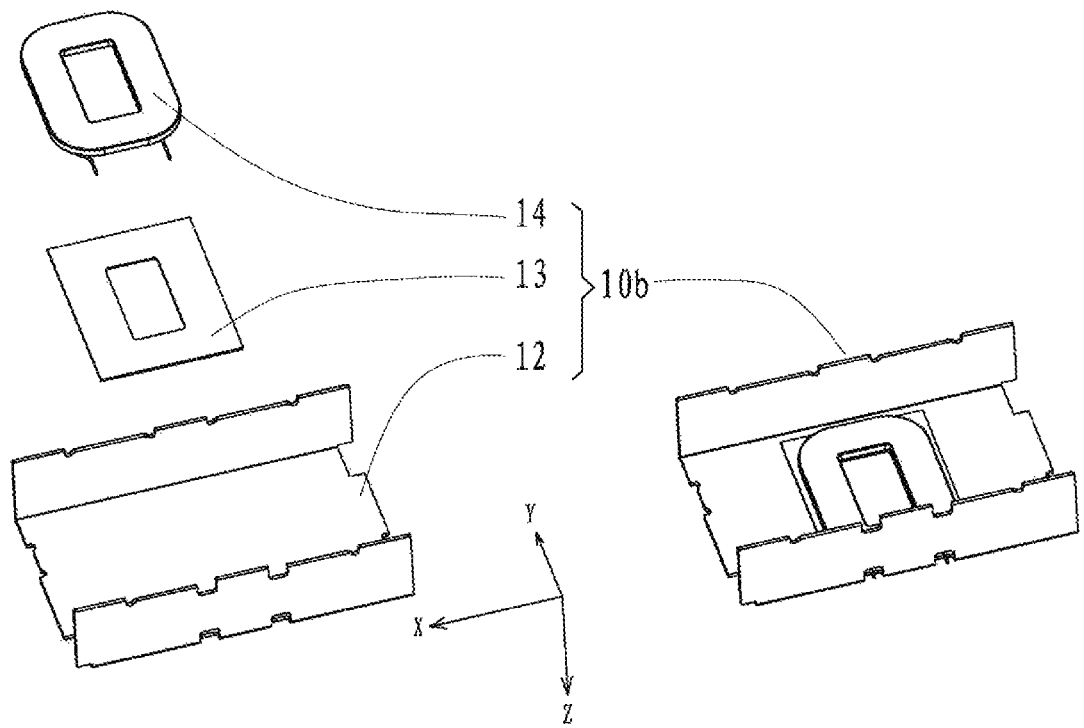
FIG. 5 presents the upper stator of a mini subwoofer double drive low-frequency vibrator provided by the embodiment of the invention.

As is shown in the FIG. 5, the upper stator 10b of the vibrator is formed with insulating tape 13 stuck to the upper cover 12, and one end of the coil 14 fixed on the insulating tape 13.

Figure 6:
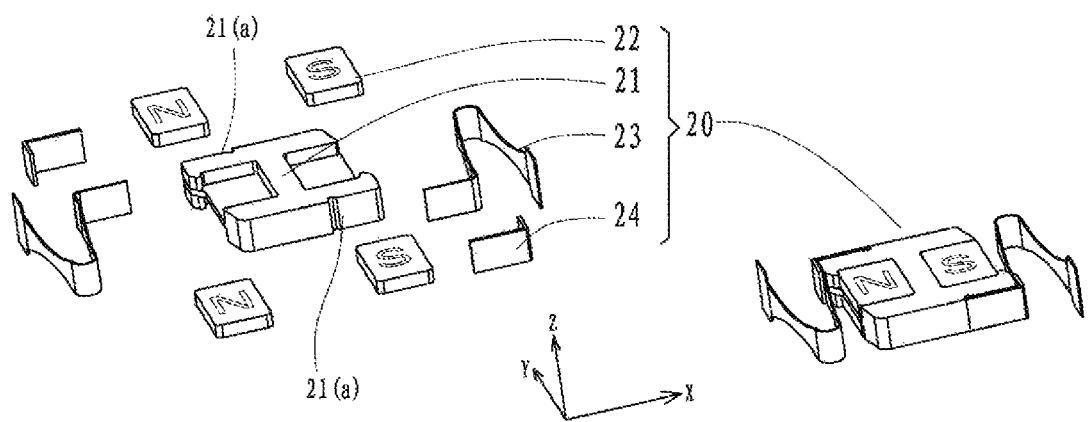
FIG. 6 presents the vibration generator of a mini subwoofer double drive low-frequency vibrator provided by the embodiment of the invention.

As is shown in the FIG. 6, the magnetic body 22 is fixed in the holes on the upper and lower sides of the counterweight 21 symmetrically distributed from top to bottom to form two working surfaces. (The positive direction of Z axis is the upper working surface, and the negative direction is the lower working surface) One end of the spring piece 23 is closely attached to the stepped face of counterweight 21 after it overlaps with internal welding piece 24. The vibration generator 20 can be formed with the magnetic body 22, counterweight 21, spring piece 23 and internal welding piece 24 fixed together after riveting or laser welding.

Figure 7:
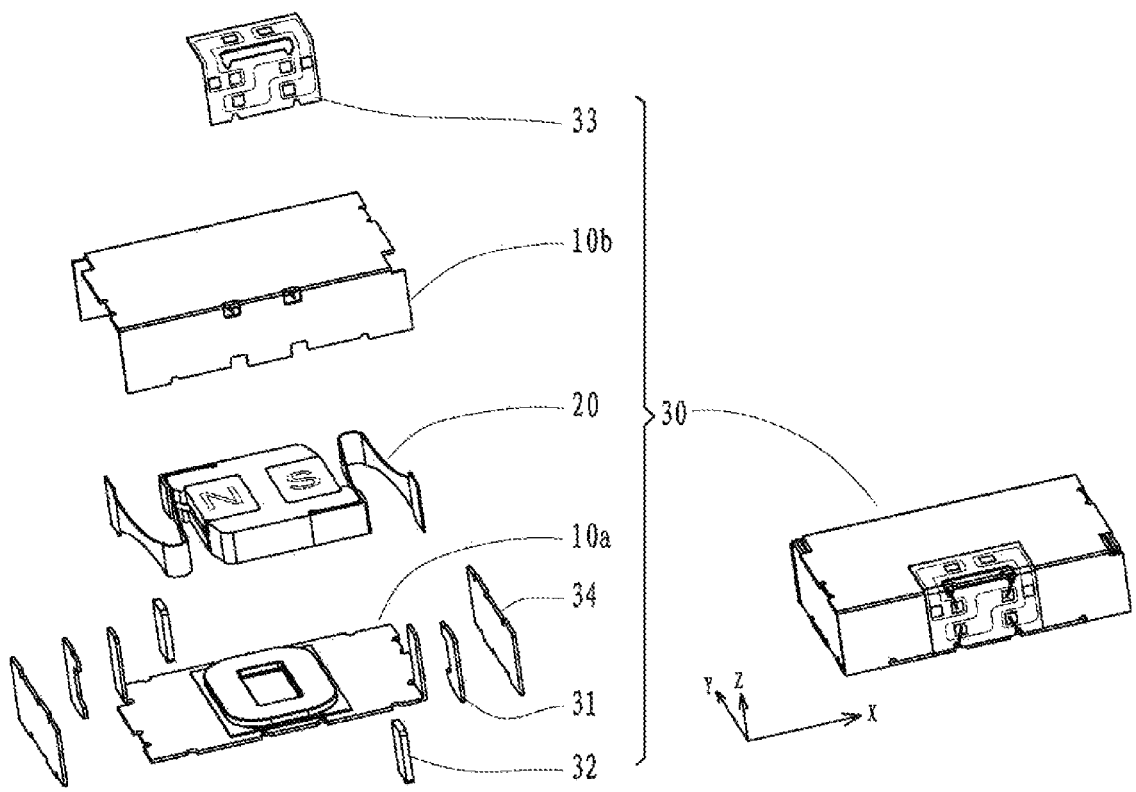
FIG. 7 presents the vibration body of a mini subwoofer double drive low-frequency vibrator provided by the embodiment of the invention.

As is shown in the FIG. 7, the magnet 22 of the lower working surface in the vibration generator 20 is directly opposite to and spaced from the coil 14 in the lower stator 10a; the other end of the spring piece 23 is close to the side column of the base 11 and is fixed with the external welding piece 24 by laser welding after the overlapping; the coil 14 of the upper stator 10b is directly opposite to and spaced from the magnet 22 of the upper working surface in the vibration generator 20; the upper cover 12 of the upper stator 10b is buckled with the base 11 of the lower stator 10a to form a vibration body 30 after each two are fixed by laser welding.

A symmetrical driving circuit is formed, with one end of the flexible printed circuit board 33 with a notch stuck to the side of the upper cover 12, and the wire ends of two coils 14 welded on the flexible printed circuit board 33. The other end of the flexible printed circuit board 33 is stuck to the front of the upper cover 12, and a bonding pad is set to connect with the external driving circuit.

The vibration generator is in the middle of lower stator and upper stator. The two magnetic working surfaces of vibration generator are directly opposite to and spaced from the coils of lower stator and upper stator. As the coil is powered on, the electromagnetic forces are generated on the upper and lower working surfaces of the vibration generator to create a symmetrical drive; Two spring pieces feature a V-shape structure and are distributed symmetrically in the center with one end respectively fixed on two diagonal angles of the counterweight and the other fixed on the side column of the base accordingly; Different response frequencies can be obtained by adjusting the width of deformation zone of the spring piece or changing the material thickness. The response frequency of the mini subwoofer low-frequency vibrator is set at 40-100 hz; The vibrator also includes side cover and buffer; the buffer is bonded to the side column of the base; the side cover welded on the two sides of the vibration body forms a closed space with the lower stator and the upper stator to create a sound cavity and, in the meantime, protect vibration generator and coil from external damage.

Figure 8:
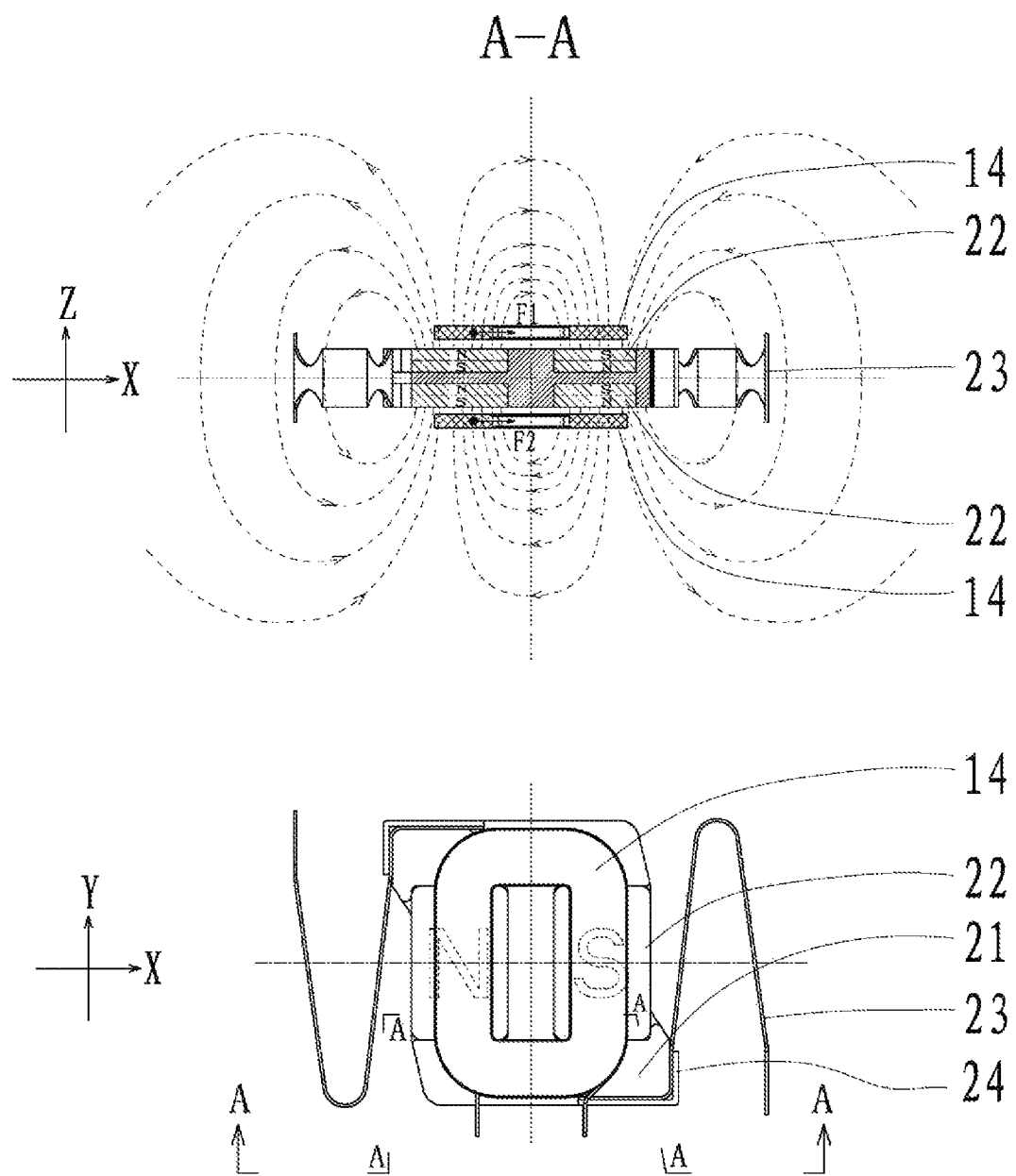
FIG. 8 presents the vibration principle of a mini subwoofer double drive low-frequency vibrator provided by the embodiment of the invention.

As is shown in FIG. 8, the vibration generator 20 is in the middle of coil 14 of lower stator 10a and coil 14 of upper stator 10b. Both upper and lower magnetic working surface of vibration generator 20 are opposite to the coil 14 of upper stator 10b and lower stator 10a. As the coil 14 is driven by current, the electromagnetic force F1 and F2 will be generated between the upper and lower side of vibration generator 20 and coil 14 to form symmetrical drive; As is demonstrated by the current direction in the diagram, the tensile deformation will be caused on the spring piece 23 in the positive direction of X axis and compressive deformation on the spring piece 23 in the negative direction of X axis; As the frequency variation of driving current is consistent with the response frequency of vibration generator 20, the kinetic energy and elastic potential energy can be converted synchronously through the spring piece 23, thus setting spring 20 in reciprocating motion along the X axis and making it seen as vibration from outside.

Figure 9:
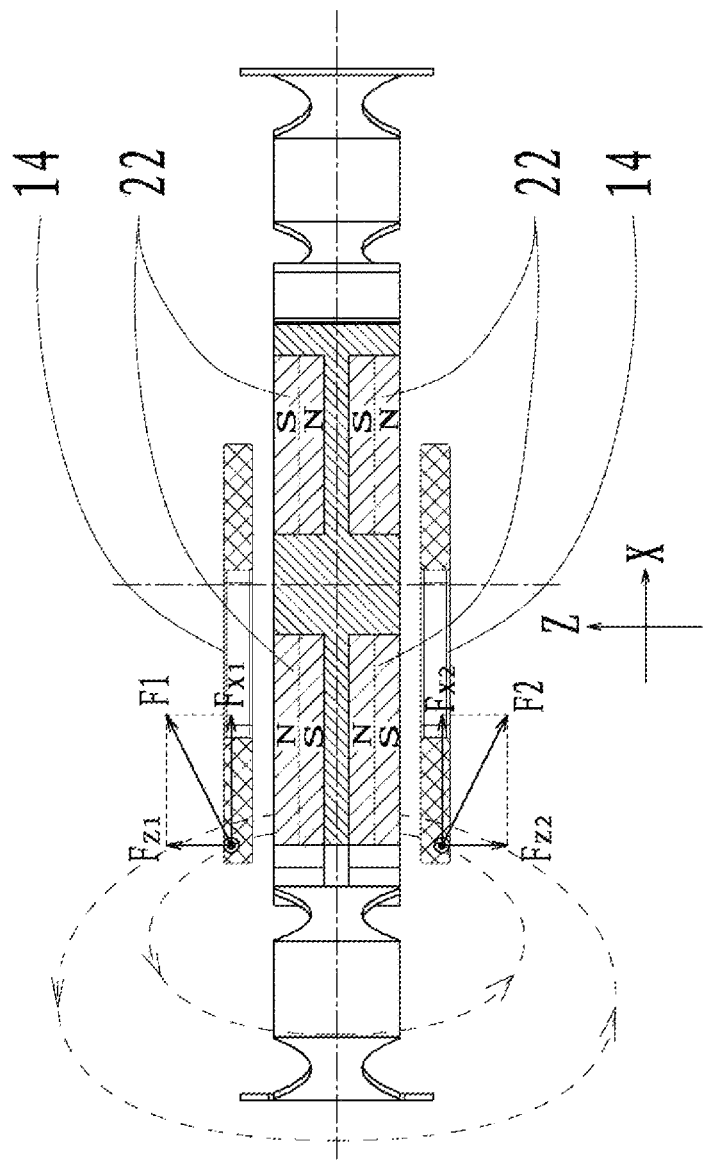
FIG. 9 presents electromagnetic force balance of a mini subwoofer double drive low-frequency vibrator provided by the embodiment of the invention.

As is shown in the FIG. 9, when the vibration generator 20 moves to the edge of coil 14, an angle is formed between X axis and electromagnetic force F1 and F2 generated from the edge of coil 14, because of the spiral field line; In this way, the electromagnetic force F1 generates component FZ1 in a positive direction along the Z axis, while force F2 produces component FZ2 in a negative direction along the Z axis; Due to the adopted symmetrical drive, the components FZ1 and FZ2 become equal in size, thus making the reactive forces on vibration generator 20 counteract each other. It avoids displacement for vibration generator 20 on Z axis and cancels vibration noises.

It should be noted that, side cover 34 can be removed in using this invention if sound cavity is set in the mounting area.

It should be noted that, in the embodiment of the invention, the area of flexible printed circuit board 33 can be expanded and driving circuit can be set by adopting chips or discrete devices or other ways which are not restricted herein.

In addition, in the embodiment of the invention, the flexible printed circuit board 33 can be extended in length to the inside of the vibration body 30 to complete welding wire ends of the coil 14.

In addition, in the embodiment of the invention, the flexible circuit board 33 can be altered into a hard substrate made of epoxy board.

It should be noted that, in the embodiment of the present invention, the counterweight block 21 can be assembled by multiple pieces for the convenience of weight adjustment. In the embodiment, the counterweight's weight 21 is altered to adjust the weight of vibration generator 20 so as to acquire different response frequencies and vibration accelerations. As the vibration generator becomes heavier, the response frequency is relatively lower, which in turn gives rise to larger vibration acceleration. In this way, the vibration can be applied in wider range to meet the demands in different scenarios and in different uses.

It should be noted that, in the embodiment of this invention, four magnetic bodies are used in the vibration generator; the magnetic field distribution which is shown in diagram 8 can be obtained by connecting with the location holes of the counterweight 21 from the top to bottom and replacing the original with two relatively thick magnetic body. Likewise, the magnetic field distribution displayed in diagram 8 can also be acquired by replacing the location holes of counterweight 21 with a large square hole in the middle and leveraging a large magnetic body magnetized in a way that two sides are divided along the central line in a reverse direction.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The above embodiments are only used to illustrate the technical solutions of the invention, instead of setting restrictions. Although the present invention has been described in detail with reference to the above-mentioned embodiments, it should be understood by those skilled in the art that technical solutions recorded in the above-mentioned embodiments can still be modified, or some of the technical features of the same can be replaced; such modifications or substitutions do not necessarily make corresponding technical solutions deviate from the spirit and scope of the technical solutions of each embodiment of the invention in nature.

What is claimed is:

1. A mini subwoofer double drive low-frequency vibrator, comprising: a base, an upper cover, a side cover, a flexible printed circuit, a first coil, a second coil, magnetic bodies, a counterweight, a spring piece, an internal welding piece, an external welding piece, a first insulating tape, a second insulating tape, a buffer, a lower stator, an upper stator, a vibration generator;

wherein the lower stator of the mini subwoofer double drive low-frequency vibrator is formed by sticking the first insulating tape on the base and fixing a first end of the first coil on the first insulating tape;

the upper stator of the mini subwoofer double drive low-frequency vibrator is formed by sticking the second insulating tape on the upper cover and fixing a first end of the second coil on the second insulating tape;

the magnetic bodies are fixed in a plurality of holes on upper and lower sides of the counterweight symmetrically distributed from top to bottom to form two working surfaces, a first end of the spring piece is attached to a stepped face of the counterweight after the spring piece overlaps with the internal welding piece, the vibration generator of the mini subwoofer double drive low-frequency vibrator is formed by fixing the magnetic bodies, the counterweight, the spring piece and the internal welding piece after riveting or laser welding;

a magnet of a lower working surface of the two working surfaces in the vibration generator is directly opposite to and spaced from the first coil in the lower stator; a second end of the spring piece is adjacent to a side column of the base and is fixed with the external welding piece by laser welding after an overlapping; the second coil of the upper stator is directly opposite to and spaced from the magnet of an upper working surface of the two working surfaces in the mini subwoofer double drive low-frequency vibrator; the upper cover of the upper stator is buckled with the base of the lower stator to form the mini subwoofer double drive low-frequency vibrator after the upper cover of the upper stator and the base of the lower stator are fixed by laser welding;

a symmetrical driving circuit is formed by sticking a first end of the flexible printed circuit with a notch to a side of the upper cover, welding a plurality of wire ends of the first coil and the second coil on the flexible printed circuit, and sticking a second end of the flexible printed circuit to a front of the upper cover.

2. The mini subwoofer double drive low-frequency vibrator according to claim 1, the spring piece comprises a V-shaped structure and is distributed symmetrically in a center with the first end of the spring piece respectively fixed on two diagonal angles of the counterweight and the second end fixed on the side column of the base accordingly; a response frequency of the mini subwoofer double drive low-frequency vibrator is set at 40-100 hz.

3. The mini subwoofer double drive low-frequency vibrator according to claim 1, wherein the buffer is bonded to the side column of the base; the side cover welded on two sides of a vibration body forms a closed space with the lower stator and the upper stator, and the closed space forms a sound cavity.

* * * * *